(12) United States Patent
Stone et al.

(10) Patent No.: US 9,381,884 B2
(45) Date of Patent: Jul. 5, 2016

(54) VEHICLE SEAT

(71) Applicant: GM GLOBAL TECHNOLOGY OPERATIONS LLC, Detroit, MI (US)

(72) Inventors: Bruce L. Stone, Lake Orion, MI (US); Robert W. Smith, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 120 days.

(21) Appl. No.: 14/157,829

(22) Filed: Jan. 17, 2014

(65) Prior Publication Data

US 2015/0076885 A1 Mar. 19, 2015

Related U.S. Application Data

(60) Provisional application No. 61/877,531, filed on Sep. 13, 2013.

(51) Int. Cl.
| | |
|---|---|
| *B60R 21/207* | (2006.01) |
| *B60N 2/68* | (2006.01) |
| *B60N 2/60* | (2006.01) |
| *B60N 2/70* | (2006.01) |
| *B60N 2/42* | (2006.01) |
| *B60N 2/44* | (2006.01) |

(52) U.S. Cl.
CPC ............ *B60R 21/207* (2013.01); *B60N 2/4228* (2013.01); *B60N 2/449* (2013.01); *B60N 2/6009* (2013.01); *B60N 2/68* (2013.01); *B60N 2/682* (2013.01); *B60N 2/686* (2013.01); *B60N 2/7011* (2013.01); *B60N 2/7094* (2013.01)

(58) Field of Classification Search
CPC ................................ B60N 2/44; B60R 21/207
USPC .............. 297/452.18, 452.55, 452.5, 452.34, 297/284.9, 218.1, 452.14
See application file for complete search history.

(56) References Cited

U.S. PATENT DOCUMENTS

| | | | | |
|---|---|---|---|---|
| 2,931,427 | A * | 4/1960 | Goldstein | 297/452.43 |
| 4,580,840 | A * | 4/1986 | Cunningham et al. | 297/452.18 |
| 5,988,674 | A * | 11/1999 | Kimura et al. | 280/730.2 |
| 6,450,528 | B1 * | 9/2002 | Suezawa et al. | 280/730.2 |
| 7,222,915 | B2 * | 5/2007 | Philippot et al. | 297/216.13 |
| 7,637,529 | B2 * | 12/2009 | Tracht | 280/728.3 |
| 8,079,640 | B2 * | 12/2011 | Kim et al. | 297/224 |
| 9,108,552 | B2 * | 8/2015 | Awata | B60R 21/207 |
| 2008/0296958 | A1 * | 12/2008 | Peterson et al. | 297/452.18 |
| 2011/0316320 | A1 * | 12/2011 | Kulkarni et al. | 297/452.48 |
| 2013/0082494 | A1 * | 4/2013 | Festag et al. | 297/216.1 |

FOREIGN PATENT DOCUMENTS

| | | |
|---|---|---|
| CN | 202480927 U | 10/2012 |
| CN | 102858591 A | 1/2013 |
| JP | 2006167251 A | 6/2006 |
| JP | 2012521930 A | 9/2012 |

* cited by examiner

*Primary Examiner* — David R Dunn
*Assistant Examiner* — Jody Giacoman
(74) *Attorney, Agent, or Firm* — Quinn Law Group, PLLC

(57) ABSTRACT

A vehicle seat includes a seat bottom and a seatback operatively coupled to the seat bottom. The seatback includes a substantially rigid polymeric substrate and an outer layer covering the polymeric substrate.

18 Claims, 5 Drawing Sheets

VEHICLE SEAT

CROSS-REFERENCE TO RELATED APPLICATION

This application claims the benefit of U.S. Provisional Application 61/877,531, filed Sep. 13, 2013, which is hereby incorporated by reference in its entirety.

TECHNICAL FIELD

The present disclosure relates to vehicle seats.

BACKGROUND

Vehicles, such as cars, include vehicle seats. For instance, a vehicle may include several rows of vehicle seats. The vehicle operator occupies a vehicle seat in a front row, while passengers may occupy vehicle seats in a rear row. The vehicle seats occupy space inside the passenger compartment of the vehicle. It is therefore useful to minimize the space occupied by the vehicle seats in the passenger compartment of a vehicle.

SUMMARY

It is useful to incorporate at least one ultra-thin seat into a vehicle in order to minimize the space occupied by the seat in the passenger compartment of a vehicle. As used herein, the term "ultra-thin seat" refers to a seat with a seatback having a thickness that is less than 140 millimeters. For example, the seatback of an "ultra-thin seat" may have a thickness ranging between 75 millimeters and 140 millimeters. By minimizing the space occupied by the vehicle seat, the vehicle occupants' comfort is enhanced.

In an embodiment, the vehicle seat includes a seat bottom and a seatback operatively coupled to the seat bottom. The seatback includes a substantially rigid polymeric substrate and an outer layer covering the polymeric substrate. The seatback is characterized by the absence of molded foam in order to minimize the space occupied by the vehicle seat in the passenger compartment of a vehicle.

The present disclosure also relates to vehicles such as cars. In an embodiment, the vehicle includes a vehicle body defining a passenger compartment. In addition, the vehicle includes a vehicle seat as described above. This vehicle seat is disposed in the passenger compartment.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
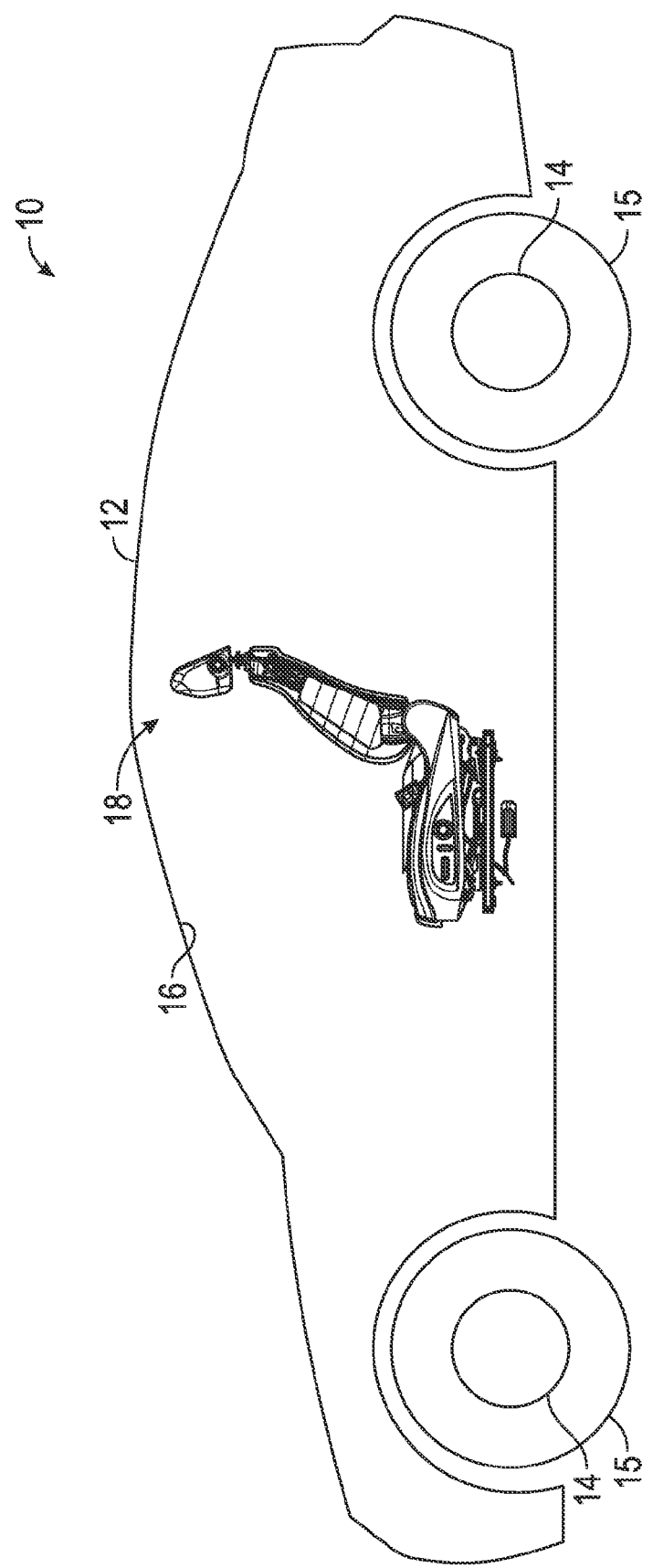
FIG. 1 is a schematic, side view of a vehicle.

Referring to the Figures, wherein like reference numbers correspond to like or similar components throughout the several views, FIG. 1 schematically illustrates a vehicle 10 such as a car or a truck. The vehicle 10 includes a vehicle body 12 and wheels 14 operatively coupled to the vehicle body 12. Each wheel 14 is operatively coupled to a tire 15. Accordingly, the tires 15 are also operatively coupled to the vehicle body 12. The vehicle body 12 defines a passenger compartment 16 configured, shaped, and sized to receive at least one vehicle occupant, such as the vehicle operator. The vehicle 10 additionally includes at least one vehicle seat 18 in the passenger compartment 16. Although the vehicle seat 18 is shown in a land vehicle, it is envisioned that the vehicle seat 18 may be incorporated in other types of vehicles such as airplanes and boats.

Figure 2:
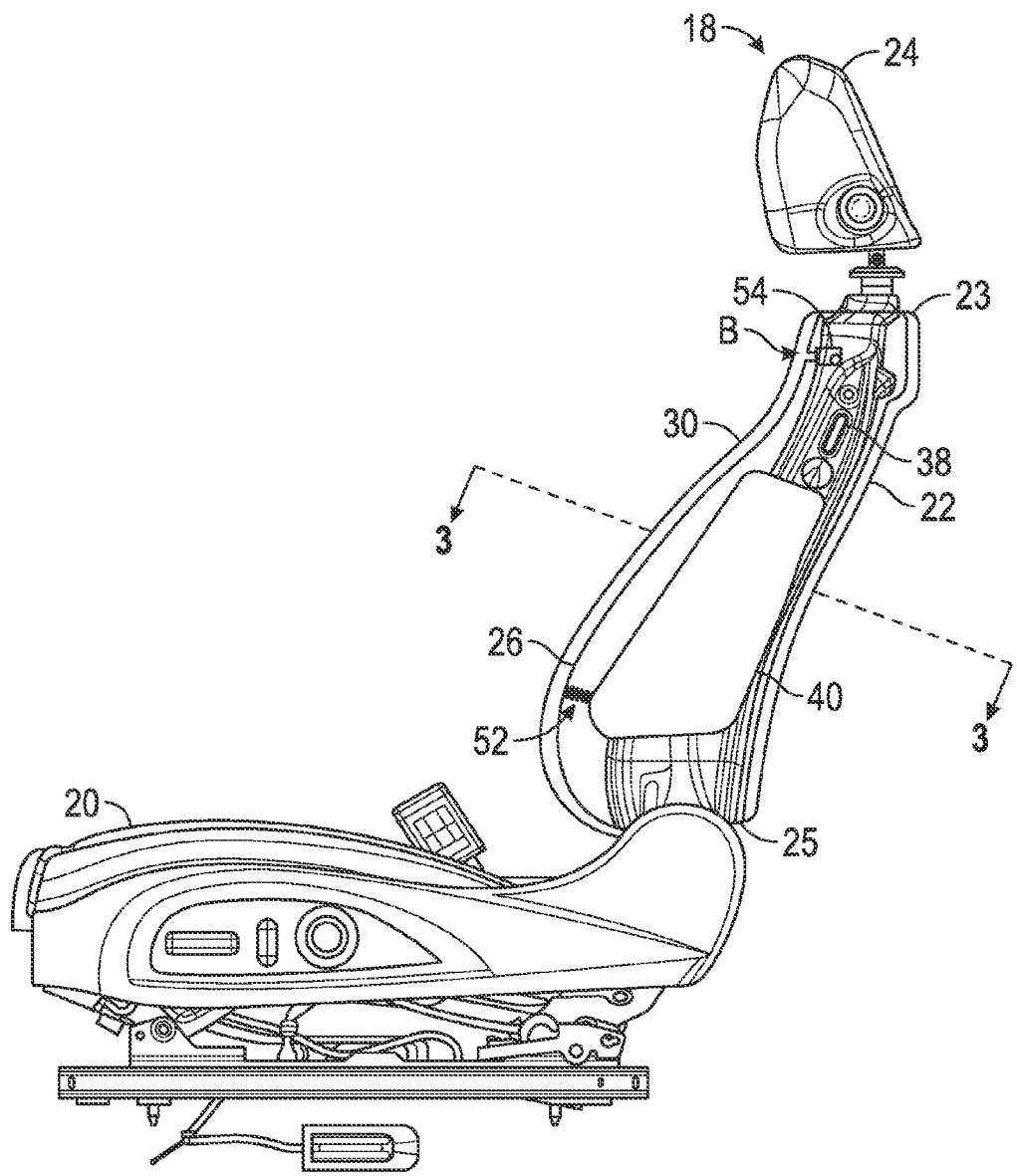
FIG. 2 is a schematic, side view of a vehicle seat of the vehicle shown in FIG. 1.
Figure 3:
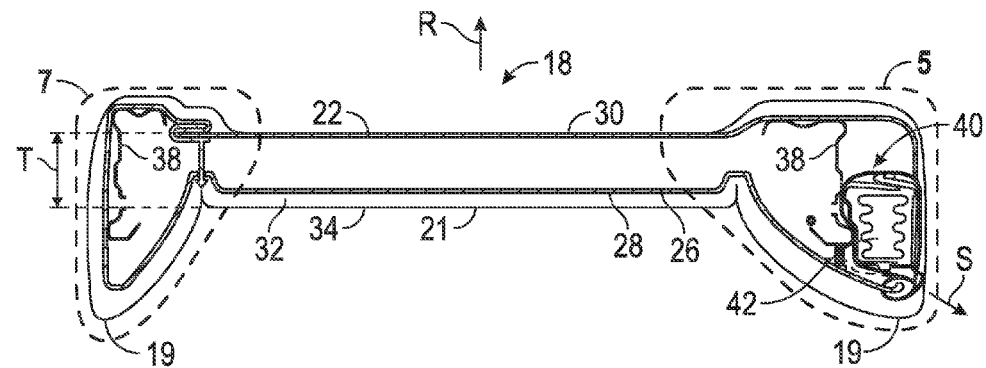
FIG. 3 is a schematic, cross-sectional top view of the vehicle seat shown in FIG. 2, taken along section line 3-3 of FIG. 2, showing a polymeric substrate and an outer layer covering the polymeric substrate.

With reference to FIGS. 2 and 3, the vehicle seat 18 includes a seat bottom 20, a seatback 22 operatively coupled to the seat bottom 20, and a headrest 24 operatively coupled to the seatback 22. Thus, the seatback 22 is operatively coupled between the seat bottom 20 and the headrest 24. Specifically, the seatback 22 includes a first or top edge 23 and a second or bottom edge 25 opposite the first edge 23. The headrest 24 is closer to the first edge 23 than to the second edge 25. The vehicle seat 18 includes two lateral sections 19, and middle section 21 located between the two lateral sections 19. Moreover, the vehicle seat 18 may be an "ultra-thin seat." As used herein, the term "ultra-thin seat" refers to a seat with the seatback having a thickness that is less than 140 millimeters. The thickness T (FIG. 3) is a maximum thickness in the middle section 21 of the seatback 22. For example, the thickness T may be less than 140 millimeters. Also, the thickness T may range between 75 millimeters and 140 millimeters.

The seatback 22 includes a polymeric substrate 26, which may be formed by a monolithic panel 28 (FIG. 3). Alternatively, the polymeric substrate 26 may include a plurality of interconnected panels. In addition, the polymeric substrate 26 is wholly or partly made of a substantially rigid polymer such as polypropylene. Accordingly, the polymeric substrate 26 can be referred to as a substantially rigid polymeric substrate 26. Specifically, the polymeric substrate 26 should be made of a material sufficiently rigid to absorb energy resulting from an impulse experienced by the vehicle 10 at low speeds (i.e., between 5 and 10 miles per hour). The polymeric substrate 26 is substantially solid.

In addition to the polymeric substrate 26, the seatback 22 includes an outer layer 30 wrapping the polymeric substrate 26. The outer layer 30 may entirely wrap the polymeric substrate 26. In an embodiment, the outer layer 30 includes a foam layer 32 and a trim 34 covering the foam layer 32 (FIG.

3). The foam layer 32 may be made of a suitable polymer such as polyurethane but is not made of molded foam. The seatback 22 is completely devoid of molded foam. It is useful to construct the seatback 22 devoid of molded foam in order to minimize the space occupied by the vehicle seat 18 in the passenger compartment 16. The trim 34 may entirely cover the foam layer 32 and may be made of leather or a polymer.

Aside from the trim 34, the seatback 22 includes at least one support frame 38 disposed within the polymeric substrate 26. In particular, the support frame 38 is wrapped by the polymeric substrate 26. The support frame 38 is made of a substantially rigid material such as steel or any other suitable material. In particular, the support frame 38 should be made of a material sufficiently rigid to absorb energy resulting from an impulse experienced by the vehicle 10 at high speeds. Because the support frame 38 may be made of a metal, such as steel, it may also be referred to as the metallic support frame.

The seatback 22 may also include an airbag assembly 40 at least partially disposed within the polymeric substrate 26. Specifically, the airbag assembly 40 is attached to the support frame 38. The airbag assembly 40 includes an airbag 42 configured to deploy in the direction indicated by arrow S when the vehicle 10 experiences a lateral impulse.

Figure 4:
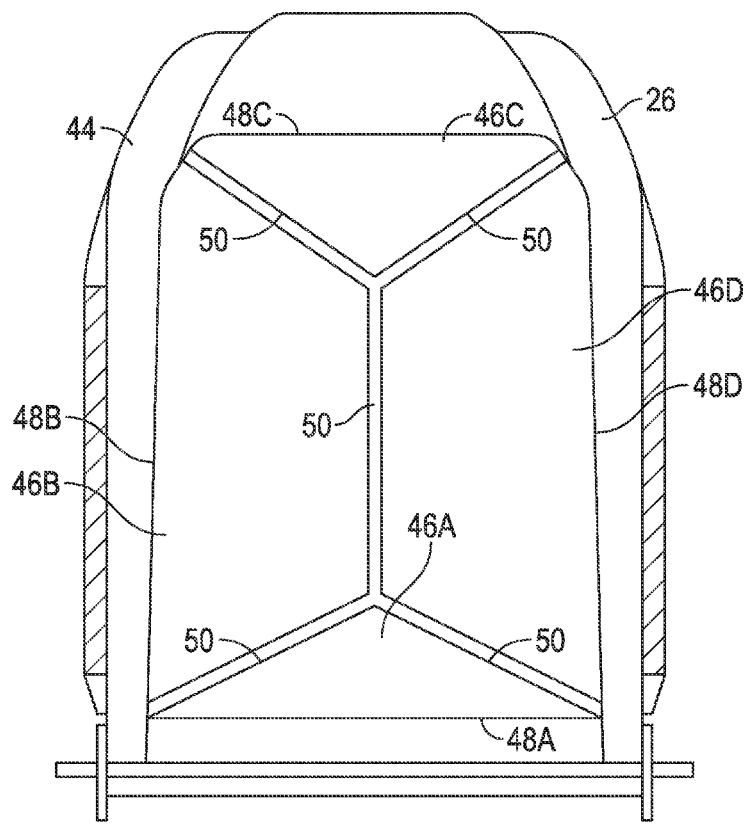
FIG. 4 is a schematic, cross-sectional front view of the vehicle seat shown in FIG. 2, showing the polymeric substrate.

With reference to FIG. 4, the polymeric substrate 26 includes an outer substrate body 44 and a plurality of flaps 46A, 46B, 46C, 46D movably coupled to the outer substrate body 44. The flaps 46A, 46B, 46C, 46D may alternatively be referred to as movable panels. In particular, the flaps 46A, 46B, 46C, 46D are pivotally coupled to the outer substrate body 44. As a non-limiting example, living hinges 48A, 48B, 48C, 48D can pivotally couple the outer body 44 to the flaps 46A, 46B, 46C, 46D, respectively. To form the flaps 46A, 46B, 46C, 46D, the polymeric substrate 26 defines cutouts 50. When the vehicle 10 experiences a rearward impulse, the flaps 46A, 46B, 46C, 46D can move backwards in the direction indicated by arrow R (i.e., a rearward direction R shown in FIG. 3) in order to allow the vehicle occupant sitting on the vehicle seat 18 to move in the rearward direction R.

Figure 5:
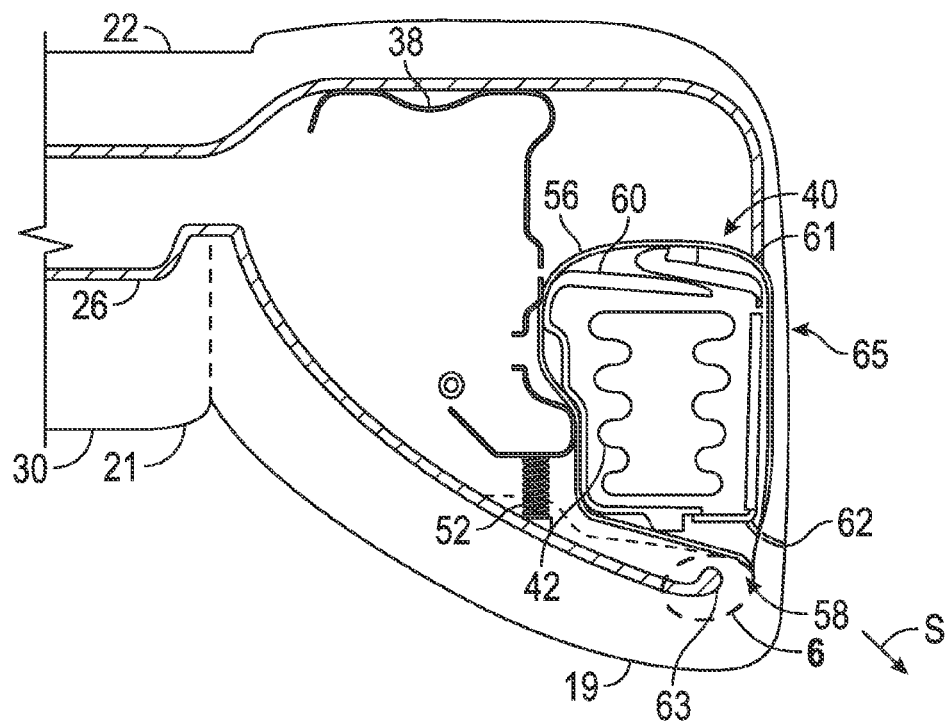
FIG. 5 is a schematic, cross-sectional top view of a portion of the vehicle seat shown in FIG. 2, taken around section 5 of FIG. 3, showing the polymeric substrate, outer layer, a support frame, and an air bag assembly.

With reference to FIGS. 2 and 5, the seatback 22 includes at least one spring 52, such as a coil spring, operatively coupled between the polymeric substrate 26 and the support frame 38. In particular, the spring 52 may be directly connected to the polymeric substrate 26 and the support frame 38. The spring 52 is configured to bias the polymeric substrate 26 away from the support frame 38 when the vehicle occupant's back rests against the seatback 22 in order to enhance the vehicle occupant's comfort. As shown in FIG. 2, the spring 52 is closer to the second edge 25 than to the first edge 23 of the seatback 22. However, a fastener 54, such as a bolt, directly couples the polymeric substrate 26 to the support frame 38. Accordingly, the polymeric substrate 26 is directly fixed to the support frame 38 at a location B that is closer to the first edge 23 than the second edge 25. At the location B, the polymeric substrate 26 remains substantially stationary relative to the support frame 38, thereby enhancing the vehicle occupant's comfort.

Figure 6:
FIG. 6 is a schematic, cross-sectional top view of a portion of the vehicle seat shown in FIG. 2, taken around section 6 of FIG. 5, showing a blunt edge of the polymeric substrate.

With reference to FIGS. 5 and 6, the seatback 22 houses the airbag assembly 40. The airbag assembly 40 is disposed inside the polymeric substrate 26 but outside the support frame 38. In the depicted embodiment, the airbag assembly 40 includes an airbag chute 56 having a tearable seam 58. The tearable seam 58 tears upon inflation of the airbag 42 to allow the airbag 42 to deploy outside of the seatback 22. The airbag 42 further includes an airbag housing 60 surrounded by the airbag chute 56. The airbag housing 60 is disposed within the airbag chute 56 and includes a housing door 62 capable of opening when the airbag 42 is inflated. As discussed above, upon inflation, the airbag 42 deploys in the direction indicated by arrow S. To facilitate deployment of the airbag 42, the polymeric substrate 26 defines an opening 65 demarcated by two edges 61, 63. The edge 63 is blunt and may therefore be referred to as the blunt edge 63 (i.e., an unsharpened edge). The blunt edge 63 may have a substantially rounded shape and facilitates deployment of the airbag 42 in the direction indicated by arrow S. The tearable seam 58 is adjacent the blunt edge 63. Because the blunt edge 63 does not have sharp corners, the airbag 42 can slide along the blunt edge 63 when it deploys in the direction indicated by arrow S. The edge 61 of the polymeric substrate 26 may also be blunt.

Figure 7:
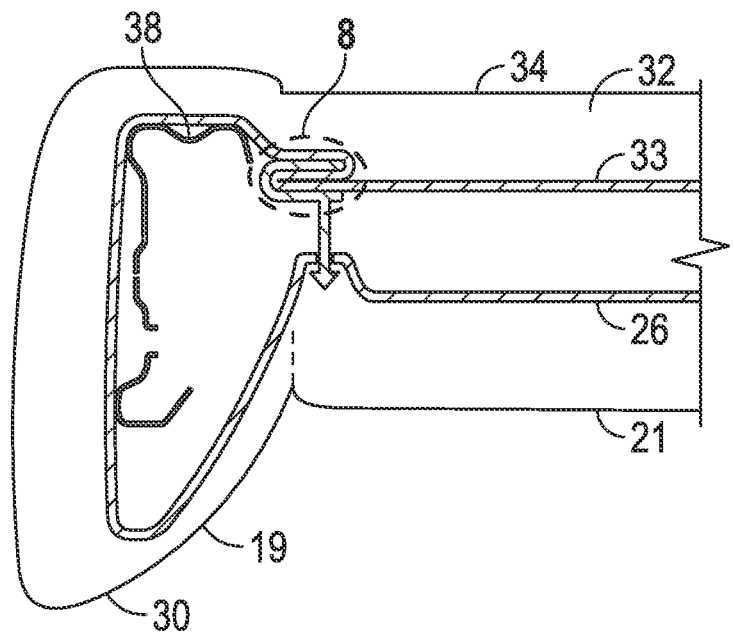
FIG. 7 is a schematic, cross-sectional top view of a portion of the vehicle seat shown in FIG. 2, taken around section 7 of FIG. 5, showing the polymeric substrate, outer layer, and a support frame.
Figure 8:
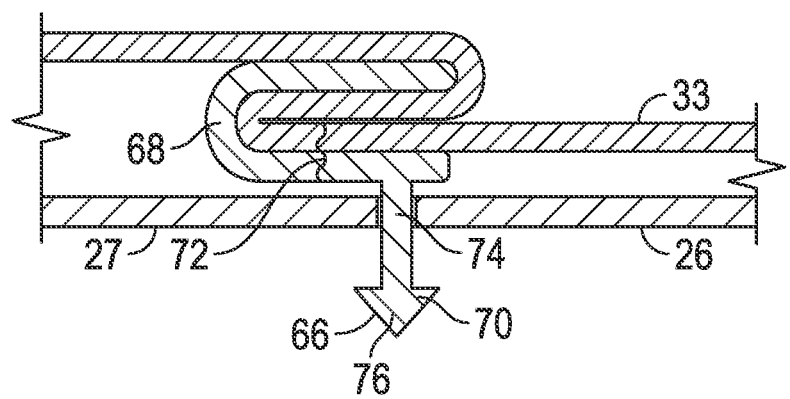
FIG. 8 is a schematic, cross-sectional top view of a portion of the vehicle seat shown in FIG. 2, taken around section 8 of FIG. 7, depicting a fastener coupling a polymeric substrate to the outer layer of the vehicle seat.

With reference to FIGS. 7 and 8, the seatback 22 further includes a J-clip, such as a "J & arrow" clip, to couple the foam layer 32 to the polymeric substrate 26. As used herein, the term "J-clip" refers to a clip having a J-shaped hook. The term "J and arrow clip" refers to a clip having a J-shaped hook and arrow-shaped hook coupled to the J-shaped hook. In the depicted embodiment, the J-clip 66 couples an inner film 33 of the outer layer 32 to the polymeric substrate 26. The J-clip 66 includes a J-shaped hook portion 68 and an arrow-shaped hook portion 70. The arrow-shaped hook portion 70 includes a column 74 and an overhang 76 that is thicker than the column 74. The column 74 can extend through the inner film 33 and the overhang 76 can abut an inner surface 27 of the polymeric substrate 26. A sewn seam 72 couples the J-shaped hook portion 68 to the inner film 33, whereas the arrow-shaped hook portion 70 extends through the polymeric substrate 26 and thereby interconnects the outer layer 30 to the polymeric substrate 26.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A vehicle seat, comprising:
   a seat bottom;
   a seatback operatively coupled to the seat bottom, wherein the seatback defines a first edge and a second edge opposite to the first edge and the seatback includes:
      a substantially rigid polymeric substrate; and
      an outer layer covering the polymeric substrate;
   a headrest coupled to the seatback, wherein the headrest is closer to the first edge than to the second edge;
   a support frame disposed within the polymeric substrate, wherein the polymeric substrate is directly fixed to the support frame at a location that is closer to the first edge than to the second edge of the seatback; and
   a spring operatively coupled between the polymeric substrate and the support frame, wherein the spring is configured to bias the polymeric substrate away from the support frame.

2. The vehicle seat of claim 1, wherein the support frame is entirely disposed within the polymeric substrate.

3. The vehicle seat of claim 1, wherein the spring is a coil spring.

4. The vehicle seat of claim 3, wherein the polymeric substrate includes a blunt edge, and the blunt edge is disposed inside the outer layer.

5. The vehicle seat of claim 4, further comprising an airbag assembly, wherein the airbag assembly includes an air bag chute, and the air bag chute includes a tearable seam located adjacent the blunt edge.

6. The vehicle seat of claim 1, wherein the polymeric substrate includes an outer substrate body and a plurality of flaps pivotally coupled to the outer substrate body, the polymeric substrate defines a plurality of cutouts in order to form the flaps, and at least one of the cutouts is obliquely angled relative to another one of the cutouts.

7. The vehicle seat of claim 6, wherein a plurality of natural hinges pivotally couple the flaps to the outer substrate body.

8. The vehicle seat of claim 1, further comprising at least one J-clip coupling the polymeric substrate to the outer layer.

9. The vehicle seat of claim 1, wherein the seatback is completely devoid of molded foam.

10. The vehicle seat of claim 1, wherein the seatback includes a first lateral section, a second lateral section, and a middle section disposed between the first lateral section and the second lateral section, the middle section has a maximum thickness, and the maximum thickness is less than 140 millimeters.

11. The vehicle seat of claim 10, wherein the polymeric substrate extends through the first lateral section, the middle section, and the second lateral section.

12. The vehicle seat of claim 11, further comprising an airbag assembly, wherein the airbag assembly is entirely disposed inside the second lateral section.

13. A vehicle, comprising:
a vehicle body defining a passenger compartment;
a vehicle seat disposed in the passenger compartment, wherein the vehicle seat includes:
a seat bottom; and
a seatback operatively coupled to the seat bottom, wherein the seatback defines a first edge and a second edge opposite to the first edge, and the seatback includes:
a substantially rigid polymeric substrate;
an outer layer covering the polymeric substrate;
a headrest coupled to the seatback, wherein the headrest is closer to the first edge than to the second edge;
a support frame entirely disposed within the polymeric substrate; and
a fastener directly coupling the polymeric substrate to the support frame such that the polymeric substrate is directly fixed to the support frame at a location that is closer to the first edge than to the second edge of the seatback.

14. The vehicle of claim 13, further comprising a spring operatively coupled between the polymeric substrate and the support frame, wherein the spring is configured to bias the polymeric substrate away from the support frame.

15. The vehicle of claim 14, wherein the spring is a coil spring.

16. The vehicle of claim 13, wherein the polymeric substrate includes a blunt edge, and the blunt edge is disposed inside the outer layer.

17. The vehicle of claim 13, wherein the seatback is completely devoid of molded foam.

18. The vehicle of claim 13, wherein the fastener is closer to the first edge than to the second edge of the seatback such that the polymeric substrate remains stationary relative to the support frame at the location that is closer to the first edge than to the second edge of the seatback.

* * * * *